US008436809B2

(12) United States Patent
Sohn et al.

(10) Patent No.: US 8,436,809 B2
(45) Date of Patent: May 7, 2013

(54) APPARATUS, METHOD AND MEDIUM CONVERTING MOTION SIGNALS

(75) Inventors: Jun-il Sohn, Yogin-si (KR); Won-chul Bang, Seongnam-si (KR); Eun-seok Choi, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 944 days.

(21) Appl. No.: 11/896,106

(22) Filed: Aug. 29, 2007

(65) Prior Publication Data

US 2008/0158153 A1    Jul. 3, 2008

(30) Foreign Application Priority Data

Dec. 28, 2006    (KR) .......................... 10-2006-0136780

(51) Int. Cl.
*G09G 5/00*    (2006.01)

(52) U.S. Cl.
USPC ............ 345/156; 345/157; 345/158; 345/169

(58) Field of Classification Search ........... 345/156–158
See application file for complete search history.

(56) References Cited

U.S. PATENT DOCUMENTS

| 5,554,980 | A  | * | 9/1996  | Hashimoto et al. ...... 340/825.72 |
|-----------|----|---|---------|------------------------------------|
| 7,102,616 | B1 | * | 9/2006  | Sleator ......................... 345/158 |
| 7,154,473 | B2 | * | 12/2006 | Kim ............................. 345/157 |
| 2004/0070564 | A1 | * | 4/2004 | Dawson et al. ............... 345/156 |
| 2007/0268246 | A1 | * | 11/2007 | Hyatt ............................ 345/156 |

FOREIGN PATENT DOCUMENTS

| JP | 9-274535      | 10/1997 |
| JP | 9-282086      | 10/1997 |
| JP | 2000-148379   | 5/2000  |
| KR | 10-2005-0025837 | 3/2005 |

* cited by examiner

*Primary Examiner* — Amare Mengistu
*Assistant Examiner* — Premal Patel
(74) *Attorney, Agent, or Firm* — Staas & Halsey LLP

(57) ABSTRACT

An apparatus, method and medium converting a motion signal, which is capable of controlling the motion of the pointer according to a user's intention by removing noise using a filter for the detected motion signal of the pointer in accordance with the moving speed of the pointer. The apparatus includes, a motion detecting unit to detect a motion, a determining unit to determine a type of motion signal according to the detected motion, and a filter unit including at least one filter to convert the motion signal using a filter that corresponds to the type of motion signal, the filter being selected from among the at least one filter.

38 Claims, 11 Drawing Sheets

POINTING DEVICE

FIG. 6

| FILTER | KIND OF MOTION SIGNAL ||
|---|---|---|
| | MAGNITUDE(621) | PATTERN(622) |
| FIRST FILTER | 1 | #1 |
| SECOND FILTER | 2 | #2 |
| THIRD FILTER | 3 | #3 |
| FOURTH FILTER | 4 | #4 |

FIG. 10
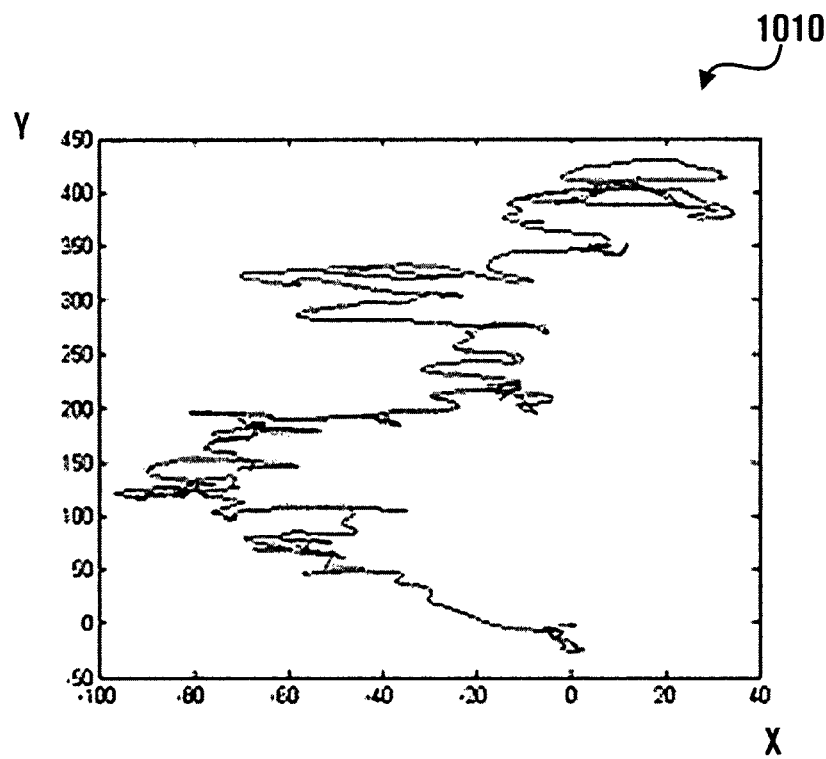
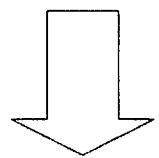
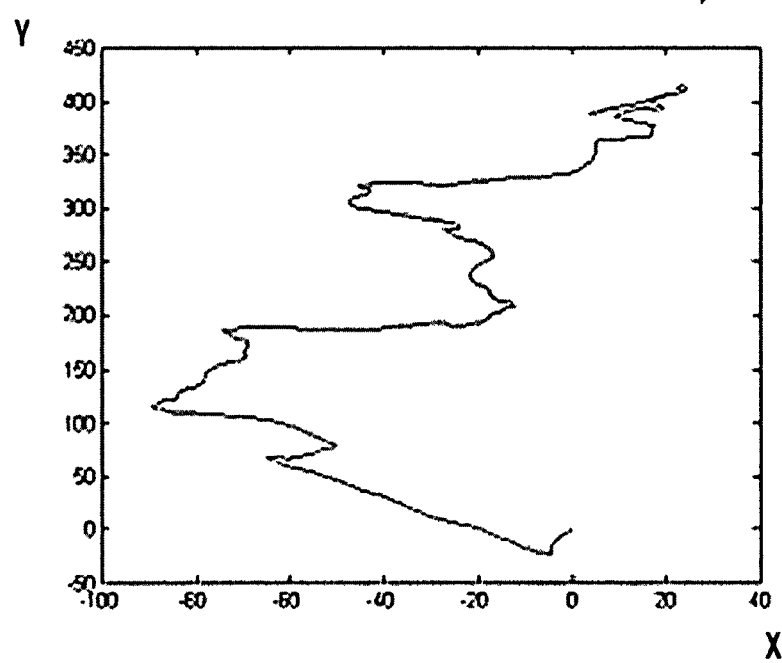

APPARATUS, METHOD AND MEDIUM CONVERTING MOTION SIGNALS

CROSS-REFERENCE TO RELATED APPLICATIONS

This application claims priority from Korean Patent Application No. 10-2006-0136780 filed on Dec. 28, 2006 in the Korean Intellectual Property Office, the disclosure of which is incorporated herein by reference in its entirety.

BACKGROUND

1. Field

One or more embodiments of the present invention relate to an apparatus, method and medium converting a motion signal, and in particular, to an apparatus, method and medium converting a motion signal that uses different filters to a motion signal for a sensed pointer on the basis of a movement speed to remove a noise.

2. Description of the Related Art

A direct pointing device is an input device that extracts a display area of a display device such as a digital TV, and detects a current position of a pointer on a screen to control a position of the pointer that is displayed on the screen of the display device.

The direct pointing device adopts a direct mapping method, that is, the pointer is displayed at a position pointed to by a user. Therefore, the direct pointing device has advantages in that it is possible to more quickly and conveniently control the position of the pointer remotely as compared with a pointing device that adopts a relative mapping method, such as a mouse, and a keypad.

However, when displaying a pointer in a display area by using such a direct pointing device, it becomes difficult for a user to determine a position of the pointer as a distance between the display device 400 and the direct pointing device becomes larger. Further, if the user does not use a direct pointing device, but a general pointing device, it is difficult for the user to determine the position of the pointer due to hand tremors, which become more serious as the distance between a panel on which the point is displayed and the pointing device becomes larger.

Therefore, a device that is capable of controlling the motion of a pointer to reflect the specific intent of the user while preventing noise, caused by such issues as hand tremors, is required.

SUMMARY

One or more embodiments of the present invention provide an apparatus, method and medium converting a motion signal that uses different filters to a motion signal of a sensed pointer, on the basis of a movement speed, to remove noise.

Additional aspects and/or advantages will be set forth in part in the description which follows and, in part, will be apparent from the description, or may be learned by practice of the invention.

To achieve at least the above and/or other aspects and advantages, embodiments of the present invention include an apparatus converting a motion signal, the apparatus including, a motion detecting unit to detect a motion, a determining unit to determine a type of motion signal according to the detected motion, and a filter unit including at least one filter to convert the motion signal using a filter that corresponds to the type of motion signal, the filter being selected from among the at least one filter.

To achieve at least the above and/or other aspects and advantages, embodiments of the present invention include an apparatus converting a motion signal, the apparatus including, a determining unit to determine a type of a motion signal based on a received motion signal, a filter unit including at least one filter to convert the received motion signal using a filter that corresponds to the type of motion signal, the filter being selected from among the at least one filter, and a coordinate determining unit to determine a coordinate of a pointer that is displayed in a display area based on the converted motion signal.

To achieve at least the above and/or other aspects and advantages, embodiments of the present invention include an apparatus converting a motion signal, the apparatus including, a receiving unit to receive an image of a pointer mapped to a coordinate, the coordinate being determined according to a motion signal that is converted using at least one filter selected according to a type of motion signal received, and a display displaying the received image.

To achieve at least the above and/or other aspects and advantages, embodiments of the present invention include a method of converting a motion signal, the method including, detecting a motion, determining a type of motion signal according to the detected motion, and converting the motion signal using a filter that corresponds to the type of motion signal, the filter being selected from among at least one filter.

To achieve at least the above and/or other aspects and advantages, embodiments of the present invention include a method of converting a motion signal, the method including, determining a type of motion signal based on a received motion signal, converting the received motion signal using a filter that corresponds to the type of motion signal, the filter selected being from among one or more filters, and determining a coordinate of a pointer that is displayed in a display area based on the converted motion signal.

To achieve at least the above and/or other aspects and advantages, embodiments of the present invention include a method of converting a motion signal, the method including, receiving an image of a pointer mapped to a coordinate determined according to a motion signal that is converted using at least one filter selected from a plurality of filters, the filter being selected according to a type of motion signal received, and displaying the received image.

To achieve at least the above and/or other aspects and advantages, embodiments of the present invention include a system for converting motion signals of a pointer for a display, the system including, a determining unit to determine whether a motion signal lies within a critical range, and a filtering unit converting the motion signal using a first filter if the determining unit determines the motion signal lies within the critical range.

BRIEF DESCRIPTION OF THE DRAWINGS

These and/or other aspects and advantages will become apparent and more readily appreciated from the following description of the embodiments, taken in conjunction with the accompanying drawings of which:

FIG. 6 illustrates a filter table, according to an embodiment of the invention;

FIG. 10 is an experimental result representing that the motion signal is converted, according to an embodiment of the present invention.

Figure 1:
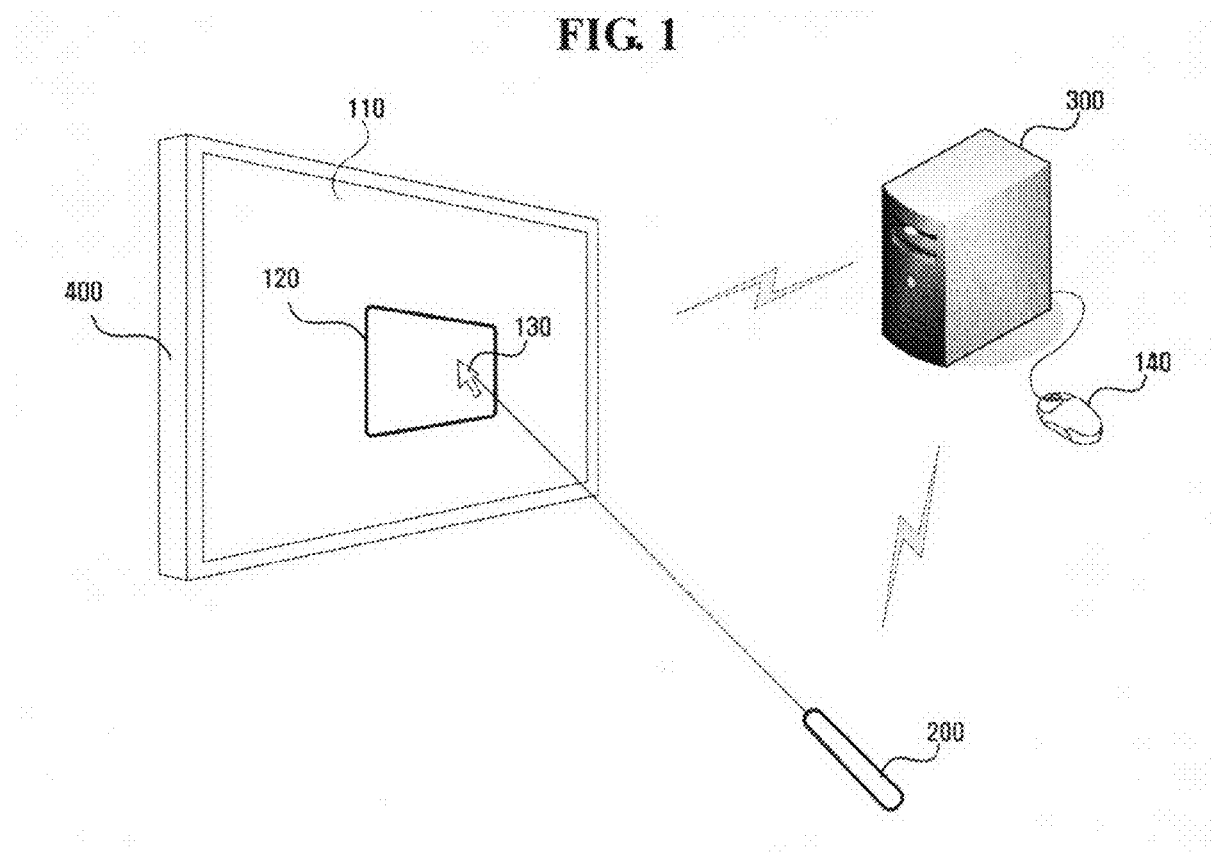
FIG. 1 illustrates a system controlling a motion of a pointer, according to an embodiment of the invention.

To achieve at least the above and/or other aspects and advantages, embodiments of the present invention include at least one medium comprising computer readable code to control at least one processing element to implement a method of converting a motion signal. The method includes determining a type of motion signal based on a received motion signal, converting the received motion signal using a filter that corresponds to the type of motion signal, the filter selected being from among one or more filters, and determining a coordinate of a pointer that is displayed in a display area based on the converted motion signal.

To achieve at least the above and/or other aspects and advantages, embodiments of the present invention include at least one medium comprising computer readable code to control at least one processing element to implement a method of converting a motion signal. The method includes receiving an image of a pointer mapped to a coordinate determined according to a motion signal that is converted using at least one filter selected from a plurality of filters, the filter being selected according to a type of motion signal received, and displaying the received image.

DETAILED DESCRIPTION OF EMBODIMENTS

Reference will now be made in detail to embodiments, examples of which are illustrated in the accompanying drawings, wherein like reference numerals refer to the like elements throughout. Embodiments are described below to explain the present invention by referring to the figures.

FIG. 1 shows a system controlling a motion of a pointer, according to an embodiment of the invention. The system may include, for example, a pointing device 200, a pointer control device 300, and a display device 400.

The pointer control device 300 may create a graphic object 120 and a mouse pointer 130 and change a coordinate of the mouse pointer 130 on the basis of a control signal received from the pointing device 200.

Here, a personal computer with a built-in CPU, for example, may be used as the pointer control device 300. Accordingly, the user may control the motion of the mouse pointer 130 using a mouse 140 connected to the pointer control device 300 and the motion of the graphical object 120 in a drag and drop manner using buttons included in the mouse 140.

When the user points to a predetermined point of a display area 110 using the pointing device 200, the pointing device 200 may communicate with the pointer control device 300, by wire or wirelessly, to transmit a control signal for moving the pointer 130. Specifically, if the user moves the pointing device 200, a motion sensor provided in the pointing device 200 may detect motion, and the detected motion signals may be transmitted to the pointer control device 300.

Here, if a control signal generated by the button provided in the pointing device 200 is transmitted to the pointer control device 300, the pointer control device 300 may select a button down function of the mouse 140 to perform a drag-and-drop operation on the graphical object 120.

In the meantime, when the user allows the pointing device 200 to point at a specific position in the display area 110 or clicks the button provided in the pointing device 200, the motion direction of the pointer 130 may not be in accord with the user's intention, due to hand tremors or inadvertent shaking caused by the of the clicking the button. For example, if the user repeatedly clicks the button of the pointing device 200, the pointer 130 may slightly reciprocate in the button click direction.

Accordingly, if the button of the pointing device 200 is clicked in a state where the pointer 130 is positioned in the graphical object 120, the graphical object 120 may be dragged and dropped due to the motion of the pointing device 200 caused by clicking the button, which may not be in accordance with the user's intention.

In order to prevent such an erroneous operation, the pointing device 200 or the pointer control device 300, according to an embodiment, may include a filter selectively passing only a specific frequency component of an input motion signal to convert the input motion signal. For example, if the pointing device 200 detects a motion, such as that caused by hand tremors of the user or inadvertent shaking caused by clicking the button, the pointing device 200 or the pointer control device 300 may cause the input motion signal to pass through a first low pass filter to remove the small motion signal.

However, when the user intends to move the pointer 130, if the input motion signal passes through the first low pass filter, the motion of the pointer 130 may be restricted which may not be in accord with the user's intention. Therefore, here, the pointing device 200 or the pointer control device 300 may convert the input motion signal using a second low pass filter whose frequency band is higher than that of the first low pass filter so as to move the pointer 130 according to the user's intention.

Here, at least one filter may be provided, and the filters may pass different frequency band signals. Therefore, the pointing device 200 or the pointer control device 300 may determine the type of input motion signal and then convert the motion signal using a filter that passes a frequency component corresponding to the type of motion signal.

In determining the type of motion signals, the pointing device 200 may use the magnitude or the pattern of the motion signal. Here, information regarding the type of motion signal and the corresponding filter, which may be previously stored, e.g., in the format of a table, may be used.

Figure 2:
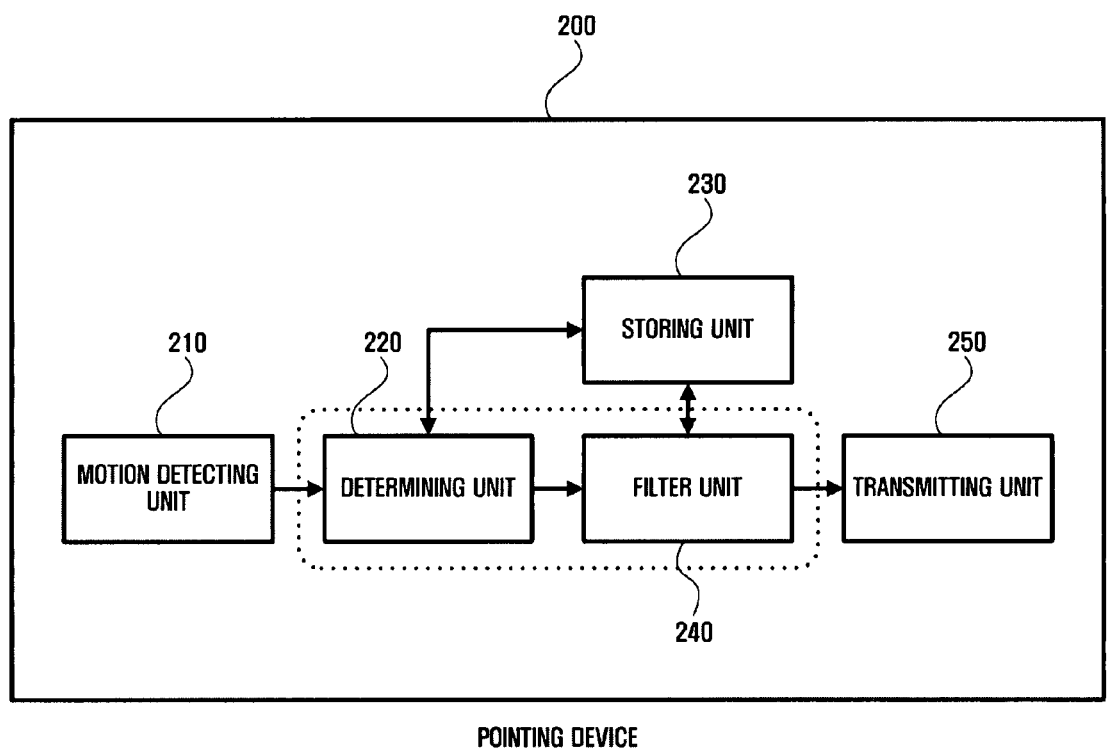
FIG. 2 illustrates a pointing device, according to an embodiment of the invention.

FIG. 2 illustrates a pointing device, according to an embodiment of the invention. The pointing device 200 may include, for example, a motion detecting unit 210, a determining unit 220, a storing unit 230, a filter unit 240, and a transmitting unit 250.

The motion detecting unit 210 may detect the motion of the pointing device 200 and detect at least one of an angular velocity and an acceleration of the motion. That is, the motion detecting unit 210 may detect a motion signal that includes at least one of an angular velocity signal and an acceleration signal to transmit to the determining unit 220.

The determining unit 220 may determine the type of transmitted motion signal. For example, when the magnitude of the motion signal is within a critical range, the determining unit 220 may determine the signal as a particular type motion such as that caused by hand tremors or button clicking, and if the magnitude of the motion signal is beyond the critical range, the determining unit 220 may determine the signal as an intentional motion having a large range of movement.

If at least one of the critical ranges is set, then at least one of the states of motion signals may be set. For example, the state may include a first state where the motion signal is within a first critical range, a second state where the motion signal is beyond the first critical range and within a second critical range, and a third state where the motion signal is beyond the second critical range and within a third range, and these states may be used to determine the types of motion signals. Here, the critical ranges may be redefined by the user.

The determining unit 220 may determine the types of signals based on a pattern of the motion signals. For example, small reciprocated motion may occur by clicking a button or according to the intention of a user. Here, if the filter for an unintentional motion signal caused by the button click is used for the intentional signal, the pointer 130 may not operate according to the user's intention.

Therefore, the determining unit 220 may determine whether the pattern of the transmitted motion signal is a pattern of an unintentional motion signal, e.g., one caused by the button clicking, or a pattern of an intentional motion signal reflecting the user's intention. In this regard, a pattern characteristic of the motion signal due to the button click and a pattern characteristic of the intentional motion signal may be stored, e.g., in the storing unit 230 of the pointing device 200.

Figure 5:
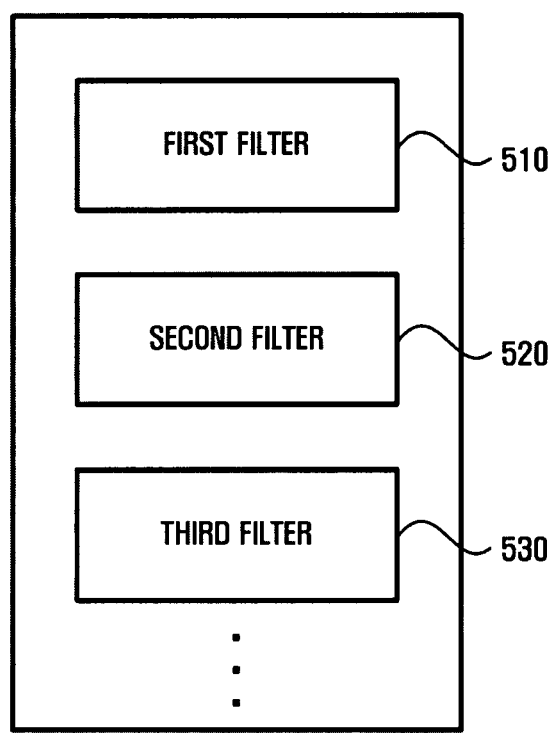
FIG. 5 illustrates a detailed configuration of a filter unit shown in FIGS. 2 and 3, according to an embodiment of the invention.

The motion signal sensed by the motion detecting unit 210 and the types of motion signal determined by the determining unit 220 may be transmitted to the filter unit 240, and the filter unit 240 may convert the motion signal using a filter that corresponds to the type of transferred motion signal, among various frequency band filters. FIG. 5 shows the detailed configuration of the filter unit 240, and the filter unit 240 may include a plurality of filters 510, 520, and 530.

The input motion signal may be converted by one of the filters provided in the filter unit 240, for example, by the first filter 510, if the motion signal is within a first critical range, by the second filter 520, if the motion signal is beyond the first critical range and within a second critical range, and by the third filter 530, if the motion signal is beyond the second critical range and within a third critical range.

In order to select a filter, the filter unit 240 may use a filter table 600 stored in the storing unit 230. The filter table 600 may represent the relationship between a type of motion signal and a frequency band filter, and may be stored in the storing unit 230. The filter table 600 will be described in more detail with reference to FIG. 6 herein below.

The storing unit 230 may store not only the filter table 600, but also the pattern characteristic of the motion signal. The storing unit 230 may be, for example, an input/output module such as a hard disk, a flash memory, a CF card (Compact Flash Card), a SD card (Secure Digital card), a SM card (Smart Media Card), an MMC (Multimedia Card), or a memory stick, and may be mounted in the pointing device 200 or mounted in a separate device. Here, if the storing device 230 is mounted in a separate device, the pointing device 200 may include a communication unit (not shown) communicating with the separate device.

The transmitting unit 250 may transmit the motion signal that is converted by the filter unit 240. In the meantime, the transmitted motion signal may be used to change the coordinate of the pointer 130 by the pointer control device 300. Furthermore, the transmitting unit 250 may transmit a signal for selecting a button provided in the pointing unit 200 to the pointer control device 300. The communication between the transmitting unit 250 and the pointer control device 300 may be performed by a wire communication method such as Ethernet, USB, IEEE1394, serial communication, and parallel communication or a wireless communication method such as Intra-red Data Communication, a Bluetooth, a Home RF, and a wireless LAN.

Figure 3:
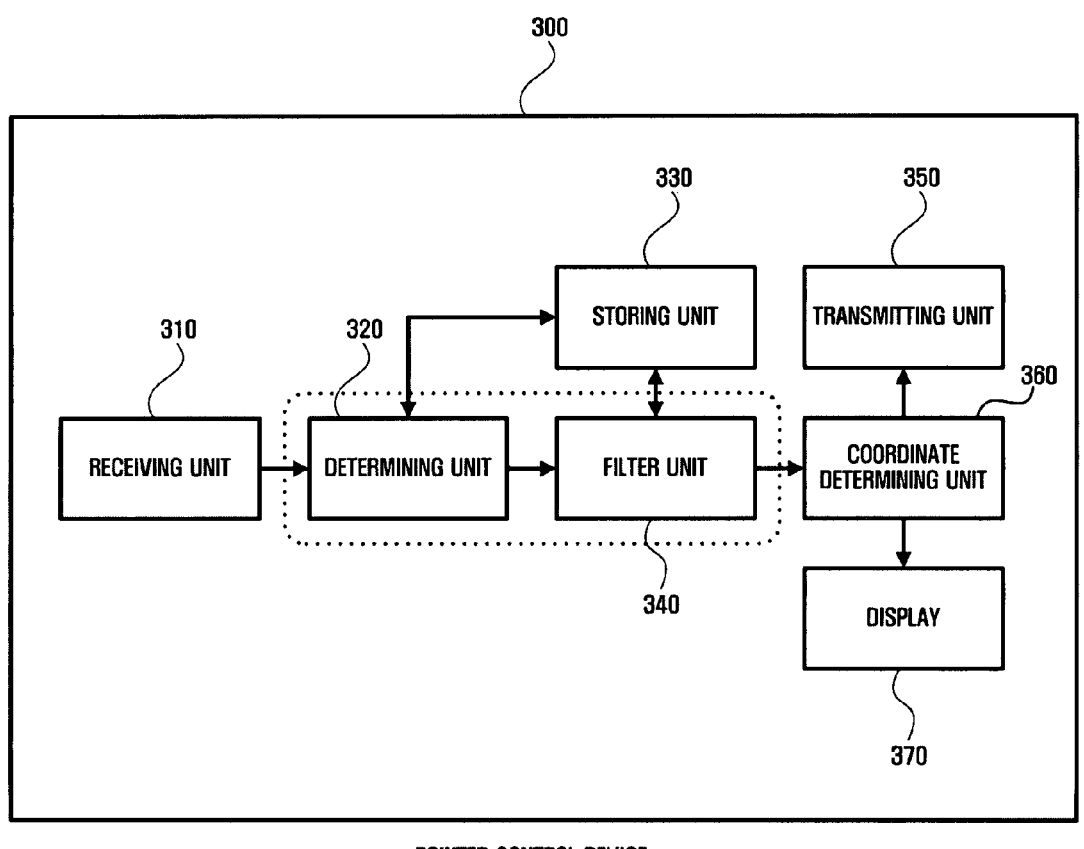
FIG. 3 illustrates a pointer control device, according to an embodiment of the invention.

FIG. 3 illustrates a pointer control device, according to an embodiment of the invention. The pointer control device 300 may include, for example, a receiving unit 310, a determining unit 320, a storing unit 330, a filter unit 340, a transmitting unit 350, a coordinate determining unit 360, and a display 370.

As described with reference to FIG. 2, the pointer control device 300 may receive the converted motion signal that is transmitted from the pointing device 200 to determine the coordinate of the pointer 130. In an embodiment, instead of providing the determining unit 220 and the filter unit 240 in the pointing device 200, the determining unit 320 and the filter unit 240 may be provided in the pointer control device 300. Here, the pointing device 200 may transmit only the motion signal regarding the sensed motion to the pointer control device 300, and the pointer control device 300 may convert the motion signal according to the type of received motion signal.

In order to convert the motion signal according to the type of received motion signal and determine the coordinate of the pointer, the receiving unit 310 of the pointer control device 300 may receive the motion signal from the pointing device 200.

The received motion signal may be transmitted to the determining unit 320 to determine the type of transmitted motion signal. When determining the type of motion signal, the determining unit 320 may use the magnitude or the pattern of the motion signal. The function of the determining unit 320 provided in the pointer control device 300 is generally the same as the determining unit 220 provided in the pointing device 200, therefore, the description thereof will be omitted.

The motion signal received by the receiving unit 310 and the type of motion signal as determined by the determining unit 320 may be transmitted to the filter unit 340, and the filter unit 340 may convert the motion signal using a filter that corresponds to the type of transmitted motion signal, among at least one of the different frequency band filters. FIG. 5 shows filter unit 340, which may include a plurality of filters 510, 520, and 530.

The function of the filter unit 340 provided in the pointer control device 300 is generally the same as the filter unit 240 provided in the pointing device 200, therefore, the description thereof will be omitted.

The storing unit 330 may store not only the filter table 600, but also the pattern characteristic of the motion signal, for example. The storing unit 330 may be mounted in a separate device. Here, if the storing device 330 is mounted in a separate device, the receiving unit 310 may receive the filter table 600 from the separate device.

The coordinate determining unit 360 may determine the coordinate of the pointer 130 that is displayed in a display area on the basis of the motion signal converted by the filter unit 340. That is, the coordinate determining unit 360 may use the displacement of the motion signal that is received at a current position of the pointer 130 to calculate the absolute coordinate of the pointer 130.

The pointer 130 may be mapped to the display area on the basis of the determined coordinate of the pointer 130, and an image signal thereof may be transmitted to the display device 400 through the transmitting unit 350.

In an embodiment, if the display 370 is mounted in the pointer control device 300, the pointer 130 may be displayed in a display area of the display 370 on the basis of the coordinate of the pointer 130 determined by the coordinate determining unit 360.

The determining unit 220 or 320 and the filter unit 240 or 340 provided in the pointing device 200 or the pointer control device 300 may be embodied as a single module (hereinafter, referred to as a filtering device). Specifically, the filtering device may receive a motion signal from the pointing device 200 through a predetermined communicating unit, determine the type of received motion signal, and then pass the motion signal through a predetermined filter on the basis of the determined result to convert the motion signal. Thereafter, the converted motion signal may be transmitted to the pointer control unit 300 to determine the coordinate of the pointer.

Here, the communication between the filtering device and the transmitting unit 250 and the pointer control device 300 may be performed by a wired communication method such as Ethernet, USB, IEEE1394, serial communication, and parallel communication or a wireless communication method such as Intra-red Data Communication, a Bluetooth, a Home RF, and a wireless LAN.

Further, the filtering device may include a storing unit to store the filter table 600 and the pattern characteristics of the motion signal.

Figure 4:
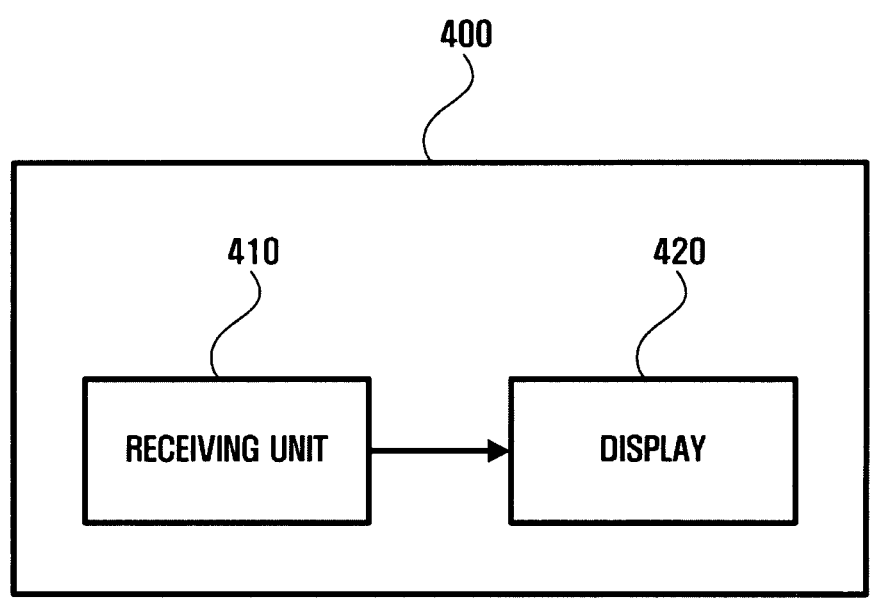
FIG. 4 illustrates a display device, according to an embodiment of the invention.

FIG. 4 illustrates a display device, according to an embodiment of the invention. The display device 400 may include, for example, a receiving unit 410 and a display 420.

The receiving unit 410 may receive an image of the pointer that is mapped to a coordinate determined according to the motion signal converted by at least one of the filters. In an embodiment, the filter that converts the motion signal may be a filter provided in the pointing device 200 or the pointer control device 300.

The received image may be transmitted to the display 420, so as to be displayed. The display 420 is a module that may include, for example, an image display unit such as a CRT (Cathode Ray Tube), an LCD (Liquid Crystal Display), an LED (Light-Emitting Diode), an OLED (Organic Light-Emitting Diode, and a PDP (Plasma Display Panel), and may display the transmitted image information.

FIG. 6 shows a filter table according to an embodiment. The filter table 600 may include, for example, a filter field 610 indicating the filters and a field 620 indicating the types of motion signals.

The filter field 610 may include various types of filters, that is, different frequency band filters may be shown in the filter field 610.

The field 620 indicating the types of motion signals may be configured by a magnitude field 621 and a pattern field 622. The magnitude field 621 typically represents the magnitude of the motion signals, and the pattern field 622 typically represents the number of patterns of the motion signals.

Here, the magnitude of the motion signal may be the aforementioned critical range. That is, the filter may determine whether the magnitude of the input motion signal is within the magnitude indicated in the magnitude field 621 or a critical range.

When the determining unit 220 or 320 determines the type of motion signal using the pattern characteristic of the motion signal, the determining unit 220 or 320 may compare the pattern characteristic of the input motion signal and the stored pattern characteristic of the motion signal to extract a similar pattern, and then confirm the pattern number that corresponds to the extracted pattern characteristic. Accordingly, the confirmed pattern number may be transmitted to the filter unit 240 or 340 to allow the filter unit 240 or 340 to convert the motion signal.

Figure 7:
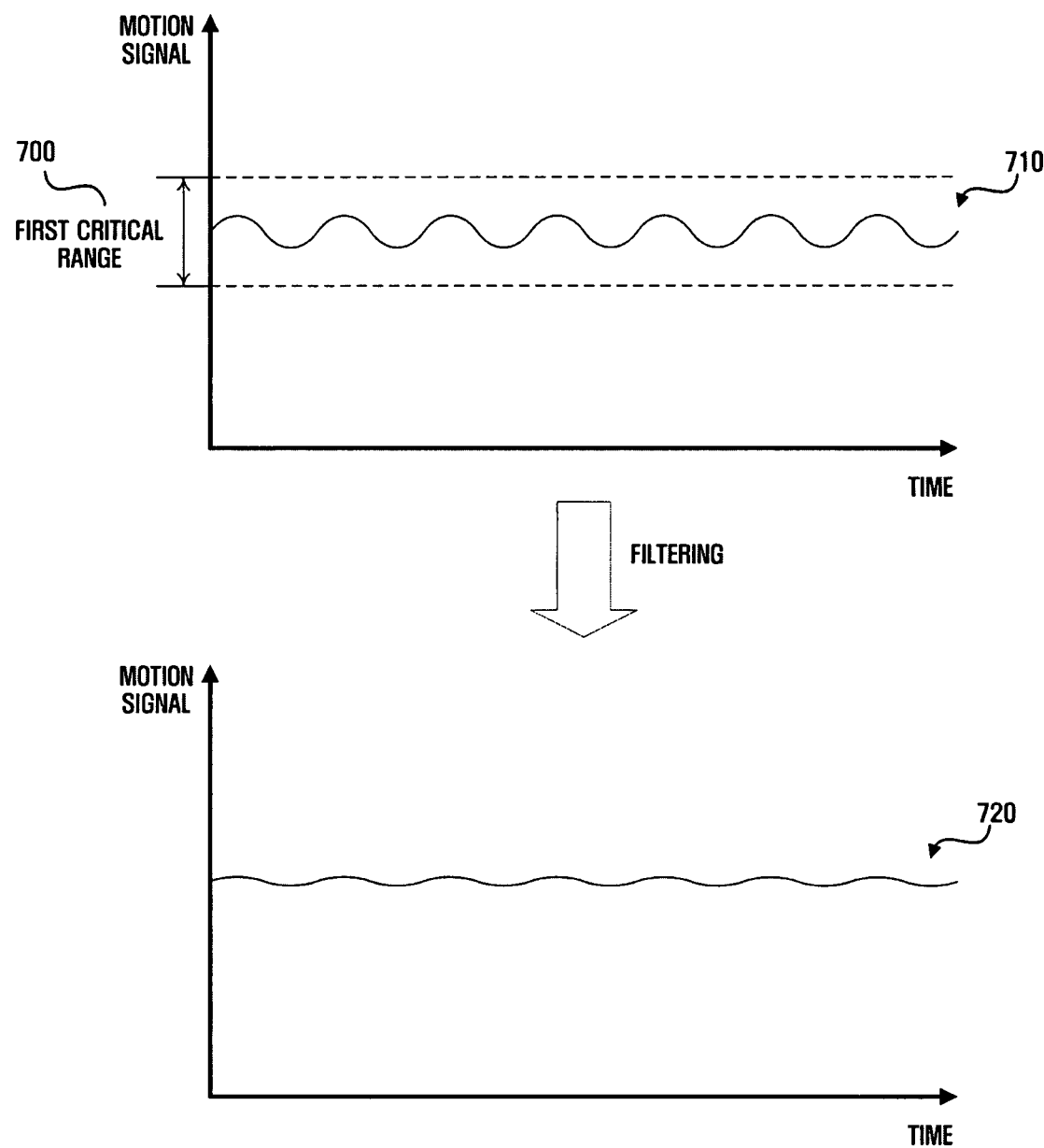
FIG. 7 illustrates a state when a motion signal is converted, according to an embodiment of the invention.

FIG. 7 shows an example in which the motion signal is changed according to an embodiment of the invention, that is, an example in which if the motion signal is created by relatively small motion 710 such as that caused for example by hand tremors or button clicking, the converted motion signal 720 may be output by a corresponding filter.

In FIG. 7, the horizontal axis may indicate the time and the vertical axis may indicate the magnitude of the motion signal. Here, if the motion signal is created as indicated by reference numeral 710, since the motion signal is within a first critical range 700, the motion signal may be changed as indicated by reference numeral 720, by the corresponding filter. That is, only a low frequency component may be passed through the filter, among the frequency components included in the motion signal 710. Accordingly, even though the pointing device 200 may move due to a relatively small motion such as that caused by hand tremors or button clicking, the amount of motion of the pointer 130 that is displayed in the display area 110 may be smaller than the actual amount of motion, due to the filtering.

Figure 8:
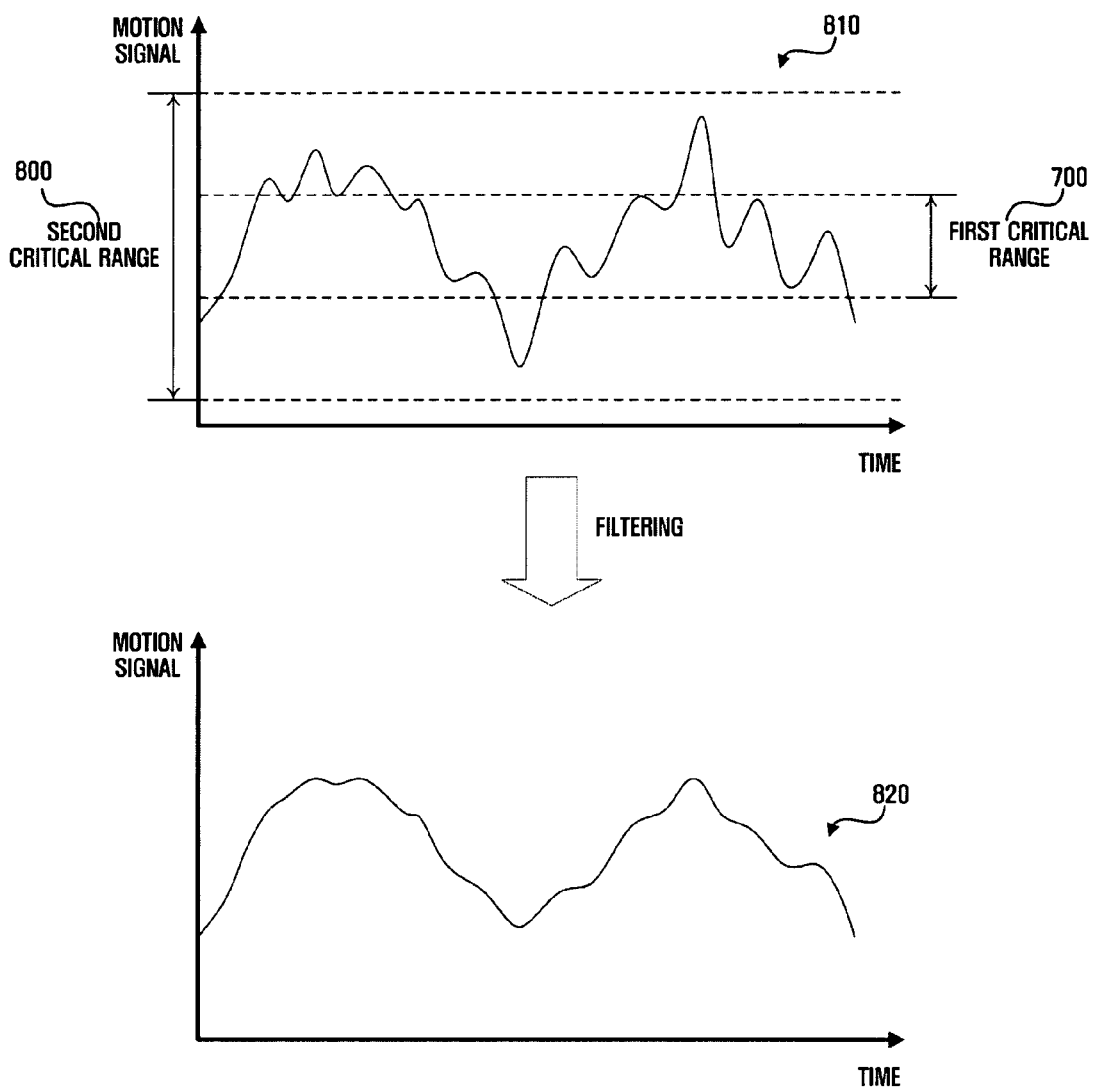
FIG. 8 illustrates a state when a motion signal is converted, according to another embodiment of the invention.

FIG. 8 shows another example in which a motion signal is changed, according to an embodiment of the invention, that is, an example in which when motion signals are created by a relatively large motion 810 by a user and are intentionally made by the user, the converted motion signals 820 are output by a corresponding filter.

The determining unit 220 or 320 may confirm the type of motion signal using the fact that the magnitude of the input motion signal is beyond the first critical range 700 and within a second critical range 800, and thus the filter 240 or 340 may convert the motion signal 810 using the corresponding filter.

As shown in FIG. 8, the motion signal 820 may be formed while maintaining the entire contour of the actual input motion signal 810. That is, only the invisible portion of the motion of the pointer 130 may be removed, and thus the user may perceive that the pointer 130 moves more in accordance with his/her intention.

Figure 9:
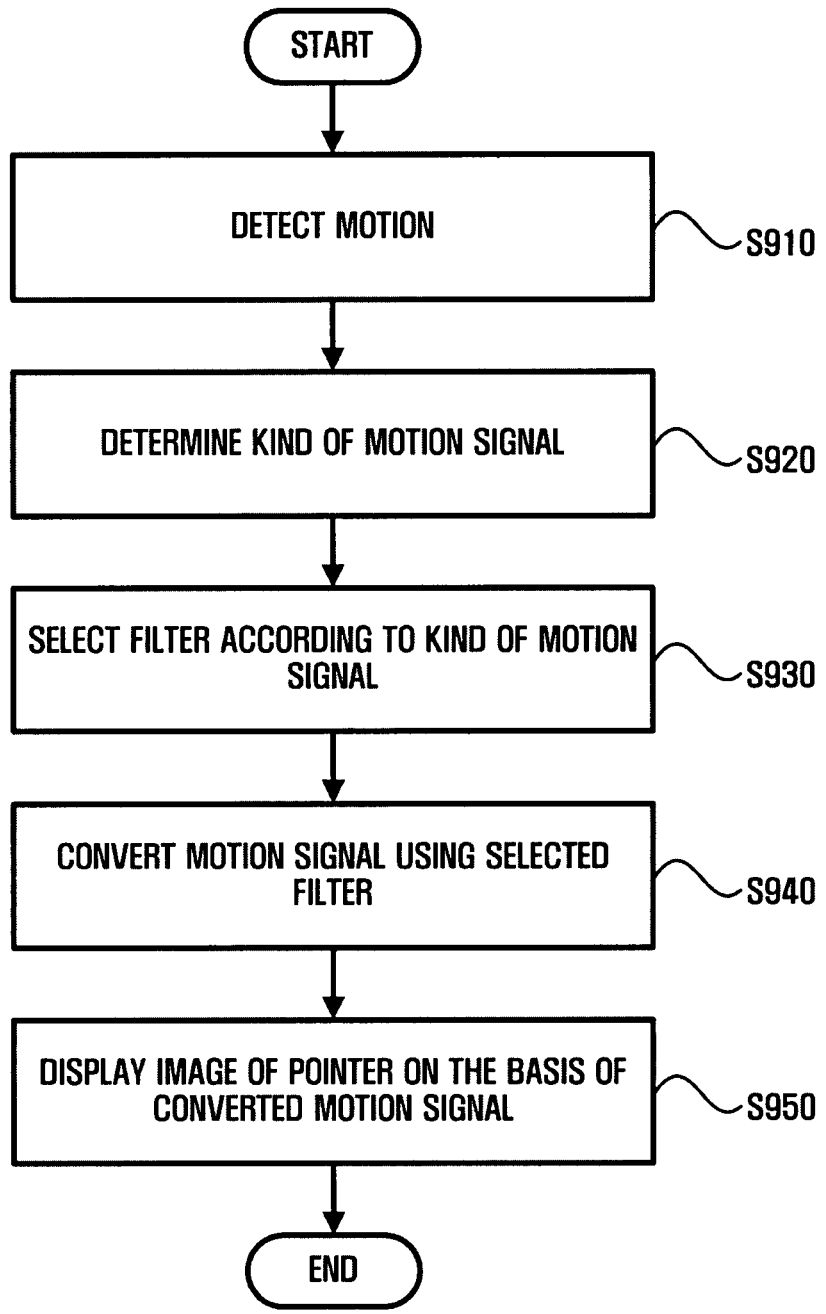
FIG. 9 illustrates a process of controlling a motion of a pointer, according to an embodiment of the invention.

FIG. 9 illustrates a method of controlling the motion of the pointer, according to an embodiment of the invention.

In operation S910, motion is detected. For example, in order to control the motion of the pointer 130, the motion detecting unit 210 of the pointing device 200 may detect the motion of the pointing device 200. Here, the detected motion may be at least one of an angular velocity and an acceleration, and thus, the motion detecting unit 210 may include an angular velocity sensor and an acceleration sensor.

The motion detecting unit 210 may create a motion signal according to the detected motion and the created motion signal may be transferred to the determining unit 220.

A type of transferred motion signal may be determined in operation S920, e.g., by the determining unit 220. That is, the determining unit 220 may determine the critical range within which the magnitude of the input motion signal lies. Here, the determining unit 220 may determine the type of motion signal using the pattern characteristic of the motion signal.

Depending on the determined result by the determining unit 220, the type of motion signal may be transferred to the filter unit 240, and the filter unit 240 may select a filter that corresponds to the input motion signal referring to the stored filter table 600, in operation S930, and then may pass the motion signal through the selected filter to be converted, in operation S940.

Thereafter, the converted motion signal may be transmitted by the transmitting unit 250, and the pointer control device 300 may receive the motion signal and determine the coordinate of the pointer 130 using the received motion signal. Then, the pointer control device 300 may create an image in which the pointer is mapped to the determined coordinate and may transmit the image to the display device 200 to be displayed, in operation S950.

However, if the determining unit 220 and the filter unit 240 are not provided in the pointing device 200, the transmitting unit 250 of the pointing device 200 may transmit the motion signal according to the motion that is detected by the motion detecting unit 210 to the pointer control device 300, and the determining unit 320 and the filter unit 340 that are provided in the pointer control device 300 may perform the determination of the type of motion signal in operation S920, the selection of the filter in operation S930, and the conversion of the motion signal in operation S940.

Figure 11:
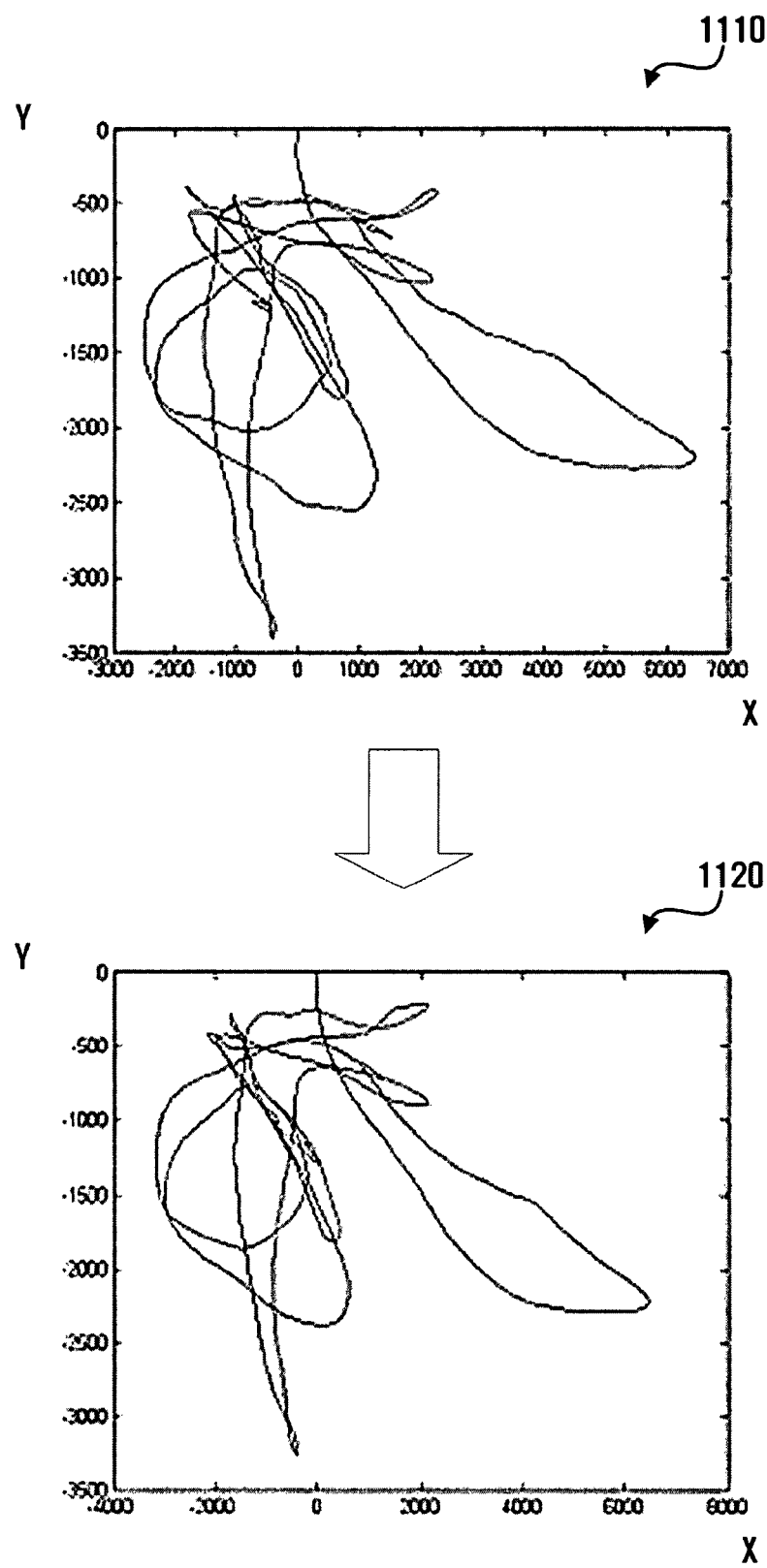
FIG. 11 is an experimental result representing that the motion signal is converted, according to an embodiment of the present invention To achieve at least the above and/or other aspects and advantages, embodiments of the present invention include at least one medium comprising computer readable code to control at least one processing element to implement a method including detecting a motion, determining a type of motion signal according to the detected motion, and converting the motion signal using a filter that corresponds to the type of motion signal, the filter being selected from among at least one filter.

FIGS. 10 and 11 show an example in which the motion signal is converted by an experiment according to one or more embodiments of the invention. More specifically FIG. 10 shows a motion signal that is created by repeatedly clicking a button of the pointing device 200 and a motion signal 1020 that is converted by the corresponding filter, and FIG. 11 shows a motion signal that is created when the pointing device 200 moves according to the user's intention, and a motion signal 1120 that is converted by a corresponding filter.

As shown in FIG. 10, if the motion of the pointer 130 is small, a filter that passes only a low frequency band of signal, among the filters provided in the filter unit 240 or 340, is generally used. Therefore, the high frequency components among the input motion signal 1010 may be removed and only the low frequency components may be output to form the converted motion signal 1020.

Further, as shown in FIG. 11, if the motion of the pointer 130 is large, a filter that passes only a high range of a low frequency band of the signal, among the filters provided in the filter unit 240 or 340 may be used. Therefore, the high frequency components among the input motion signal 1110 may be removed and only the low frequency component may be output to form the converted motion signal 1120. Here, since a relatively small amount of high frequency components are contained in the input motion signal 1110, it may be understood that the shape of the input motion signal 1110 is generally similar to the shape of the converted motion signal 1120.

According to the pointing apparatus, method and medium as described above, it may be possible to control the motion of a pointer to reflect the user's intention by removing a noise using a filter for the detected motion signal of the pointer, in accordance with the moving speed of the pointer.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A pointing device converting a motion signal, the pointing device comprising:
   a motion detecting unit to detect a motion of the pointing device;
   a determining unit to determine a type of motion signal according to the detected motion;
   a filter unit including a plurality of filters, each having different frequency bands, to convert the motion signal using a respective filter, the respective filter being selected from among the plurality of filters having different frequency bands, such that the selected filter passes a frequency component corresponding to the determined type of motion signal; and
   a coordinate determining unit to determine a coordinate of a pointer that is displayed in a display area based on the motion signal converted by the filter unit.

2. The pointing device of claim 1, wherein the motion detecting unit detects at least one of an angular velocity and an acceleration of the motion.

3. The pointing device of claim 1, wherein the type of motion signal comprises a magnitude of the motion signal.

4. The pointing device of claim 1, wherein the type of motion signal comprises a pattern of the motion signal.

5. The pointing device of claim 1, wherein the filter unit converts the motion signal using a frequency band filter that corresponds to the type of motion signal, among the different frequency band filters.

6. The pointing device of claim 1, further comprising a transmitting unit to transmit the converted motion signal.

7. An apparatus converting a motion signal, the apparatus comprising:
   a determining unit to determine a type of a motion signal based on a received motion signal;
   a filter unit including a plurality of filters, each having different frequency bands, to convert the received motion signal using a respective filter, the respective filter being selected from among the plurality of filters having different frequency bands, such that the selected filter passes a frequency component corresponding to the determined type of motion signal; and
   a coordinate determining unit to determine a coordinate of a pointer that is displayed in a display area based on the motion signal converted by the filter unit.

8. The apparatus of claim 7, wherein the type of motion signal comprises a magnitude of the motion signal.

9. The apparatus of claim 7, wherein the type of motion signal comprises a pattern of the motion signal.

10. The apparatus of claim 7, wherein the filter unit converts the motion signal using a frequency band filter that corresponds to the type of motion signal, among the different frequency band filters.

11. The apparatus of claim 7, further comprising:
    a transmitting unit transmitting the determined coordinate to a display device.

12. The apparatus of claim 7, further comprising:
    a display displaying the pointer at the determined coordinate in the display area.

13. The apparatus of claim 7, further comprising a receiving unit to receive the motion signal from a pointing device.

14. An apparatus converting a motion signal, the apparatus comprising:
    a receiving unit to receive information corresponding to a coordinate on a display, the coordinate being determined according to a motion signal that is converted using a respective filter selected among a plurality of filters, each having different frequency bands, such that the selected filter passes a frequency component corresponding to a type of motion signal received, wherein the received motion signal corresponds to a motion of a pointing device that controls a position of a pointer on the display; and a display displaying the pointer.

15. The apparatus of claim 14, wherein the converted motion signal is a motion signal that is at least one of:
converted by a first frequency band filter when the motion signal is within a first critical range; and
converted by a second frequency band filter when the motion signal is beyond the first critical range.

16. The apparatus of claim 14, wherein the type of motion signal comprises a magnitude of the motion signal.

17. The apparatus of claim 14, wherein the type of motion signal comprises a pattern of the motion signal.

18. A method of converting a motion signal of a pointing device, the method comprising:
detecting a motion of the pointing device;
determining a type of motion signal according to the detected motion;
converting the motion signal using a respective filter selected from among a plurality of filters, each having different frequency bands, such that the selected filter passes a frequency component corresponding to the determined type of motion signal; and
determining a coordinate of a pointer that is displayed in a display area based on the motion signal converted by the filter.

19. The method of claim 18, wherein the detecting of a motion comprises detecting at least one of an angular velocity and an acceleration of the motion.

20. The method of claim 18, wherein the type of motion signal comprises a magnitude of the motion signal.

21. The method of claim 18, wherein the type of motion signal comprises a pattern of the motion signal.

22. The method of claim 18, wherein the converting of the motion signal comprises converting the motion signal using a frequency band filter that corresponds to the type of motion signal, among the different frequency band filters.

23. The method of claim 18, further comprising transmitting the converted motion signal.

24. At least one non-transitory medium comprising computer readable code to control at least one processing element to implement the method of claim 18.

25. A method of converting a motion signal, the method comprising:
determining a type of motion signal based on a received motion signal;
converting the received motion signal using a respective filter selected from among a plurality of filters, each having different frequency bands, such that the selected filter passes a frequency component corresponding to the determined type of motion signal; and
determining a coordinate of a pointer that is displayed in a display area based on the motion signal converted by the filter unit.

26. The method of claim 25, wherein the type of motion signal comprises a magnitude of the motion signal.

27. The method of claim 25, wherein the type of motion signal comprises a pattern of the motion signal.

28. The method of claim 25, wherein the converting of the motion signal comprises the motion signal using a frequency band filter that corresponds to the type of motion signal, among the different frequency band filters.

29. The method of claim 25, further comprising:
transmitting the determined coordinate to a display device.

30. The method of claim 25, further comprising:
displaying the pointer at the determined coordinate in the display area.

31. At least one non-transitory medium comprising computer readable code to control at least one processing element to implement the method of claim 25.

32. A method of converting a motion signal, the method comprising:
receiving information corresponding to a display coordinate determined according to a motion signal that is converted using respective filter, the filter being selected among a plurality of filters, each having different frequency bands, such that the selected filter passes a frequency component corresponding to a type of motion signal received,
wherein the received motion signal corresponds to a motion of a pointing device that controls a position of a pointer on the display; and
displaying the pointer.

33. At least one non-transitory medium comprising computer readable code to control at least one processing element to implement the method of claim 32.

34. The method of claim 32, wherein the converted motion signal comprises a motion signal that is converted by a frequency band filter corresponding to the type of motion signal among different frequency band filters.

35. The method of claim 32, wherein the type of motion signal comprises a magnitude of the motion signal.

36. The method of claim 32, wherein type of motion signal comprises a pattern of the motion signal.

37. A system for converting motion signals of a pointing device that determines a position of a pointer displayed on a display, the system comprising:
a determining unit to determine whether a motion signal detected from motion of the pointing device is within a critical range;
a filtering unit including a plurality of filters, each having different frequency bands, to convert the motion signal using a first filter, selected from among the plurality of filters having different frequency bands, when the determining unit determines the motion signal lies within the critical range, such that the selected first filter passes a frequency component corresponding to the determination; and
a coordinate determining unit to determine a coordinate of the pointer displayed on the display based on the motion signal converted by the filter unit.

38. The system of claim 37, wherein the determining unit determines whether the motion signal lies within a first critical range and determines whether the motion signal lies within a second critical range, and
wherein the filtering unit converts the motion signal using the first filter if the determining unit determines the motion signal lies within the first critical range and the filtering unit converts the motion signal using a second filter if the determining unit determines the motion signal lies within the second critical range.

* * * * *